United States Patent [19]

Willis

[11] Patent Number: 4,519,562

[45] Date of Patent: May 28, 1985

[54] AIRCRAFT

[76] Inventor: William M. Willis, 19440 Citronia St., Northridge, Calif. 91324

[21] Appl. No.: 446,279

[22] Filed: Dec. 2, 1982

Related U.S. Application Data

[63] Continuation-in-part of Ser. No. 287,229, Jul. 27, 1981, abandoned.

[51] Int. Cl.³ .............................................. B64C 21/04
[52] U.S. Cl. .................................... 244/207; 244/12.2; 244/23 C; 244/75 R
[58] Field of Search ................. 244/73 B, 73 R, 73 C, 244/76 J, 200, 204, 207, 208, 209, 226, 12.1, 12.2, 12.5, 23 R, 23 A, 23 C, 23 D, 52, 78, 34 R, 12.3

[56] References Cited

U.S. PATENT DOCUMENTS

| | | | |
|---|---|---|---|
| 2,949,255 | 8/1960 | Glasby, Jr. | 244/207 |
| 2,967,029 | 1/1961 | Hill | 244/23 C |
| 2,990,137 | 6/1961 | Willis | 244/12.2 |
| 3,045,948 | 7/1962 | Howie | 244/73 R |
| 3,097,817 | 7/1963 | Towzey, Jr. | 244/209 |
| 3,107,071 | 10/1963 | Wessels | 244/73 R |
| 3,128,973 | 4/1964 | Dannenberg | 244/209 |
| 3,276,723 | 10/1966 | Miller et al. | 244/12.2 |
| 3,599,901 | 8/1971 | Relkin | 244/12.3 |
| 4,235,303 | 11/1980 | Dhoore et al. | 181/214 |

Primary Examiner—Trygve M. Blix
Assistant Examiner—Rodney Corl
Attorney, Agent, or Firm—Poms, Smith, Lande & Rose

[57] ABSTRACT

A vertical take-off and landing (VTOL) aircraft is disclosed. In one embodiment designed for manned flight, the aircraft employs an aerodynamically-shaped body carrying a pair of lifting elements disposed longitudinally along the body on opposite sides thereof. The lifting elements extend outwardly and curve smoothly downward from a horizontal to a vertical orientation at the outboard edge. Lifting air is flowed over them transverse to the direction of flight. In a second embodiment designed for unmanned use such as cropdusting, military surveillance, or the like, the body is a single circular lifting element of parabolic cross-section. In both embodiments, a turbine is carried within the body to provide forward thrust and, primarily, a supply of pressurized air which is flowed through a nozzle slit opening outwardly over the tops of the lifting element(s) in confined segments. A porous aspirating member provides a divergent outer boundary to the airflow adjacent the tops of the lifting surfaces in a manner which induces augmenting air into the primary airstream in sufficient quantity to maintain the resultant combined airflow in a laminar flow to maximize lift.

38 Claims, 16 Drawing Figures

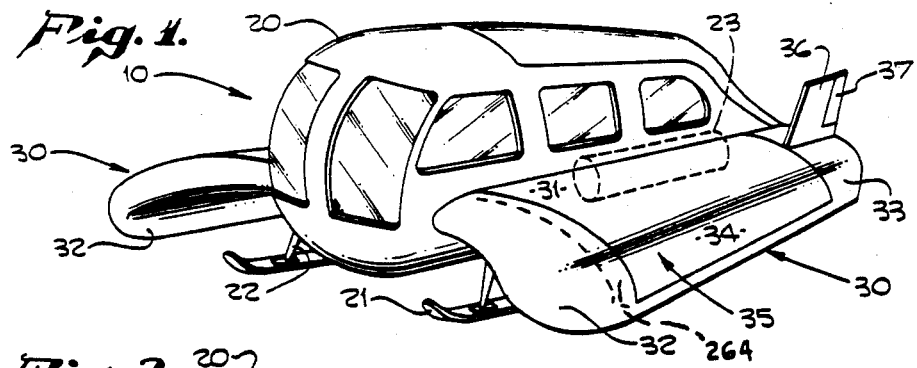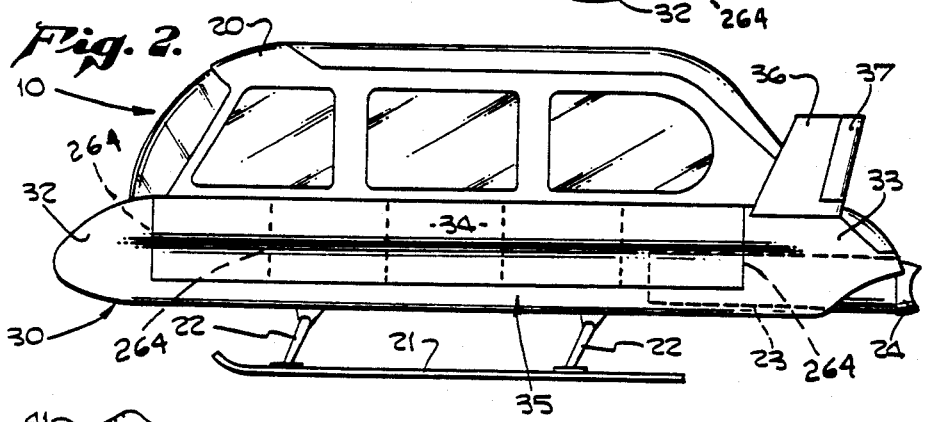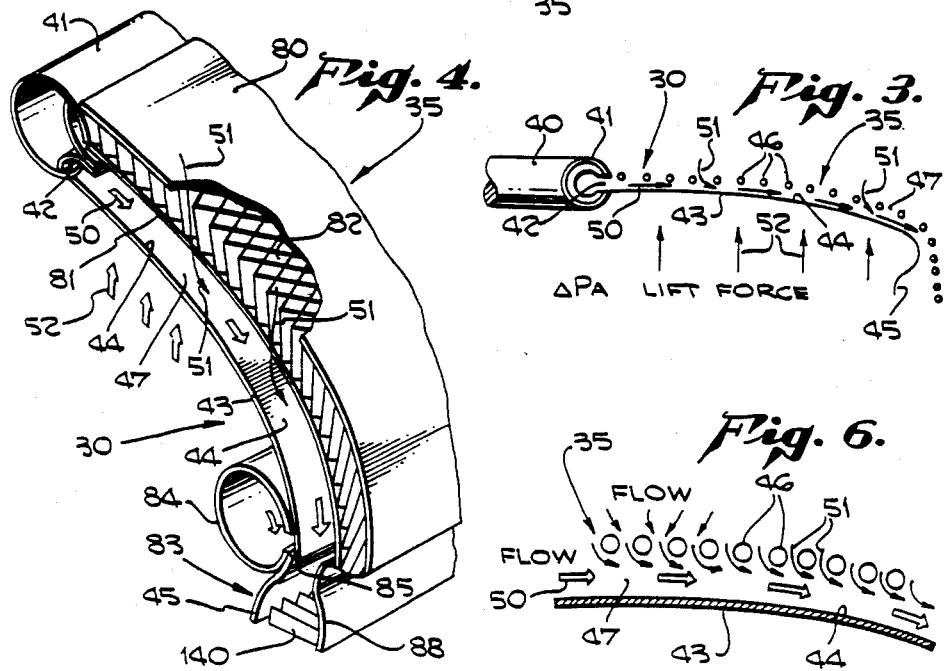

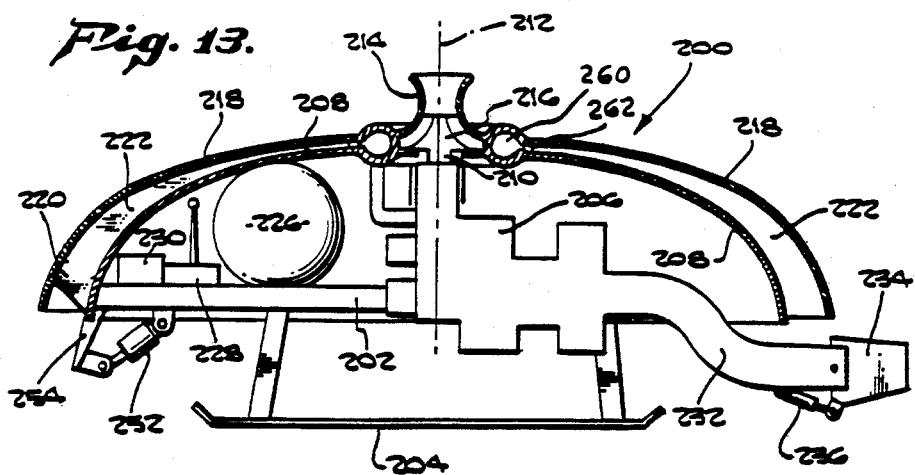
Fig. 13.
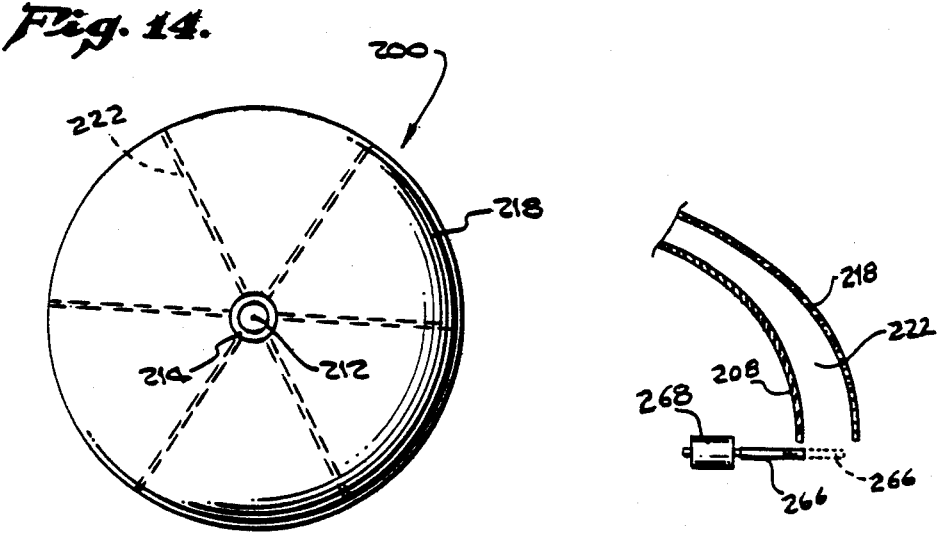
Fig. 14.
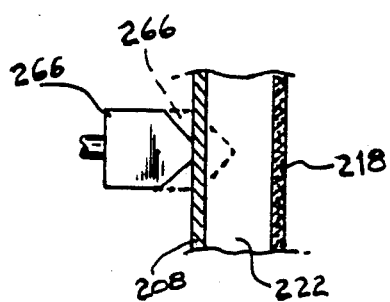
Fig. 15.
Fig. 16.

AIRCRAFT

BACKGROUND OF THE INVENTION

This application is a continuation-in-part of application Ser. No. 287,229, filed July 27, 1981, now abandoned.

The present invention relates to aircraft and, more particularly, to aircraft of the type being capable of vertical take-off and landing, hovering, and movement in horizontal or lateral flight modes.

Early examples of aircraft employing lift principles similar to those of the aircraft of the present invention are disclosed in my earlier U.S. Pat. Nos. 2,990,137; 3,237,888; and 3,365,149. Each of the aforementioned aircraft employed a lifting force derived from a fluidic principle of force amplification referred to as the "Coanda effect". The Coanda effect is a phenomenon of jet stream deflection and augmentation which, in general, provides that upon fluid flow along a surface, the fluid, such as air, has a tendency to cling or to remain parallel to the surface rather than to follow a more normal straight line flow trajectory. This effect has been known for many years and various experimenters have employed it to some extent. Recently, the Coanda effect has been employed in the design of a prototype short take-off and landing (STOL) aircraft under development for the armed services by a major aircraft manufacturer.

The problem of employing the Coanda effect to advantage has always been the providing of some means to confine fluid flow adjacent to the aerodynamic upper surface in a manner which will enable a laminar flow of air without cancelling the $\Delta P$ forces by an opposing confining means. That is, the underlying lift effect produced on an aerodynamically-shaped lifting element such as an airplane wing remains Bernoulli's principle. The airflow over the lifting element (i.e., wing) is made to travel a longer distance than the airflow beneath the wing. The longer distance is accompanied by an increase in air speed over the wing which, according to Bernoulli's principle, causes an accompanying reduction in pressure on the top surface. This $\Delta P$ causes a resultant "lift" on the wing. If a confining member is placed adjacent the upper surface, the $\Delta P$ can be destroyed and result in a complete loss of lift.

In my earlier aircraft as described in the foregoing patents, I had discovered that it was possible to shield the upper airfoil surface with a porous member whereby the airflow following the upper surface of the lifting element under the Coanda effect is protected from disruptive forces of outside air currents while allowing the maintenance of the necessary $\Delta P$ for lift.

While the aircraft of the aforementioned patents were workable for their intended purpose, there were certain shortcomings attendant thereto as regards large scale commercial applicability as to the principles disclosed therein. The apparatus was not designed for multiple passenger occupancy, provided little, if any, sound isolation, and disclosed only a basic control system. Moreover, subsequent investigations have shown that in such a confined passageway as created by the principles of the foregoing patents, a turbulence can easily be created wherein an expulsion of the primary air outward thorough the porous surface is effected with an attendant disruption in the desired laminar flow, which was the primary impetous for the construciton of a confined passageway in the first place.

Wherefore, it is one objective of the present invention to provide a commercially adaptable aircraft of the foregoing type having provision for carrying a number of occupants in quiet and comfort wherein an improved lifting and control mode of operation is provided for maximum effectiveness and ease of operability.

Additionally, there is an urgent need for a lifting platform to be used in such uses as cropdusting, military surveillance, and the like. For example, in conventional cropdusting, the lifting platform remains primarily bi-planes of, basically, World War I design. Helicopters are of limited use as cropdusters as their excessive downwash blows everything from the crop including the blooms, the bees and the material being sprayed. As a result, the cropdusters continue to use the bi-planes with attendant low efficiency, low convenience, and not infrequently, accidents.

Wherefore, it is also an objective of the present invention to provide a lifting platform of a different type and operating principle particularly adapted to the needs of such applications as cropdusting and military surveillance.

SUMMARY OF THE INVENTION

The improved lifting phenomenon employed in the present invention in its various embodiments has been accomplished by the method of creating a vertical lifting force on a lifting element curving outwardly from horizontal to vertical comprising the steps of flowing primary fluid through a nozzle slit opening across the top of the element from one side to the side opposite thereof; divergently bounding the flowing primary fluid adjacent the entire length of the top of the element with a surface of at least 40% porosity; and, continuously adding sufficient augmenting fluid to the flowing primary fluid through the porous surface to maintain the combined flowing fluid stream in laminar flow adjacent the top of the element whereby a differential pressure is created on the element tending to lift it vertically.

The disclosed preferred embodiment for a passenger-carrying aircraft employs this methodology or "Willis effect" in an aircraft comprising an aerodynamically-shaped body for housing one or more passengers; a pair of lifting elements carried by the body disposed longitudinally along the body on opposite sides thereof and extending outwardly from the body, the lifting elements curving smoothly downward from being substantially horizontal adjacent the body to substantially vertical at the outboard edge thereof; power means for producing a supply of pressurized air at an output thereof; means connected to the output of the power means for directing a flow of air through a slit opening outwardly across the upper surface of the pair of lifting elements traversing the direction of flight; and, means carried by the lifting elements for divergently bounding the airflow adjacent the upper surfaces of the lifting elements, the bounding means being of sufficient porosity in relation to the airflow that sufficient augmenting air will be aspirated through the bounding means and added to the airflow to maintain the resultant combined airflow in laminar flow adjacent the upper surfaces of the lifting elements. The preferred cross-section shape for the lifting element and porous bounding means is a half-parabola which has been found to produce an aspriated to primary air volume ratio of as much as 6:1 with attendant high "lift" production.

The preferred embodiment for use in cropdusting and the like is a radio-controlled, unmanned aircraft being of circular shape and with the same preferred parabolic cross-section.

The preferred attitude control system comprises a plurality of tapered vanes spaced radially about the periphery of the aircraft and adapted to be selectively interposed in the airstream as a "spoiler" to vary the airflow and, thereby, the lift forces on respective segments of the lifting surface.

DESCRIPTION OF THE DRAWINGS

FIG. 1 is an orthogonal drawing of an aircraft according to the preferred embodiment of the present invention for carrying passengers.

FIG. 2 is a side elevation of the aircraft of FIG. 1.

FIG. 3 is a simplified drawing of a cutaway end elevation of the lifting element employed in the present invention showing the method of producing lift force thereon.

FIG. 4 is a partially cutaway orthogonal drawing of a portion of a lifting element of the aircraft of FIG. 1 and FIG. 2 showing the preferred construction thereof.

FIG. 6 is an expanded view of the simplified drawing of FIG. 3 showing the aspiration of augmenting air employed in the present invention to maintain the laminar flow of air adjacent the lifting element.

FIG. 13 is a cutaway side elevation through the unmanned, radio-controlled embodiment of the present invention employed as a lifting platform for cropdusting, military surveillance, and the like.

FIG. 14 is a plan view of the embodiment of FIG. 13 showing thereon the position of the sidewalls used to segment and confine the airflow.

FIG. 15 is a cutaway elevation cross-section of the embodiment of FIG. 13 adjacent the inlet air outlet showing the preferred method of control.

FIG. 16 is a plan view of the tapered vane used in the apparatus of FIG. 15.

DESCRIPTION OF THE TWO PREFERRED EMBODIMENTS

Figure 5:
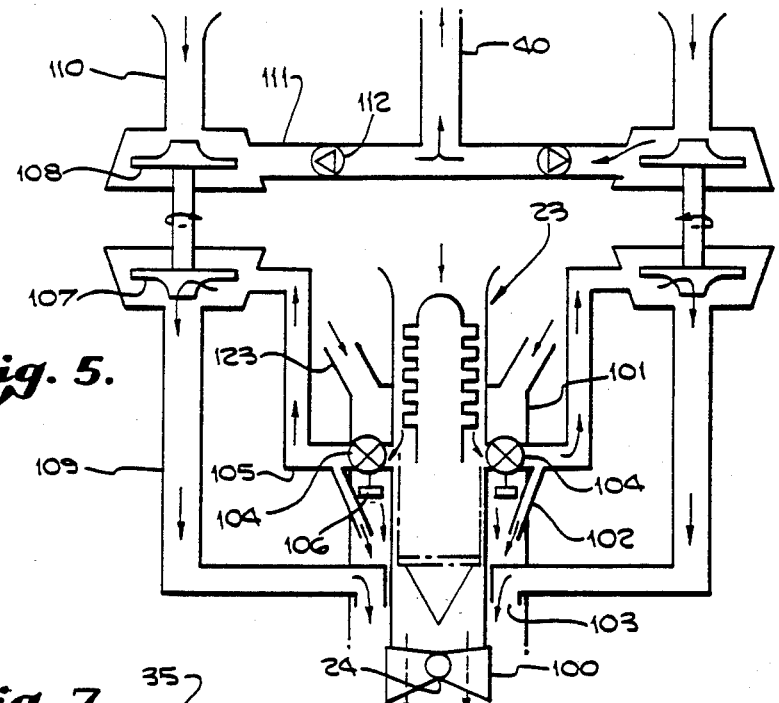
FIG. 5 is a simplified drawing of the power means and pressurized air source employed in the present invention in its embodiment of FIGS. 1 and 2.

Referring first to FIGS. 1 and 2, an aircraft, generally indicated as 10, according to the preferred embodiment for carrying passengers, is shown as comprising a fuselage 20 having a pair of lift and control assemblies, generally indicated as 30, longitudinally extending generally outward from each side. To enable an at-rest ground position and for landing and take-off, suitable landing gear in the form of skids 21 are provided, being mounted to the fuselage 20 by suitable linkages 22. The base area of the fuselage 20 is adapted to support a suitable engine structure which may be in the form of a gas turbine 23 having an exhaust outlet 24. The engine and its relationship to the remainder of the present invention will be discussed hereinafter in detail.

Both the fuselage 20 and the lift and control assemblies 30 are aerodynamically-shaped. The lift and control assemblies are generally outwardly extending structures attached to the fuselage 20 as at 31 utilizing known aircraft construction techniques which form no part of the present invention. The lift and and control assemblies 30 are rigid bodies, extending outwardly in an aerodynamically outwardly and downwardly curved configuration (i.e., curving outwardly from horizontal to vertical). Each has a forward direction enclosed portion 32 and a like rearward extending portion 33. The central area of each assembly 30 intermediate the portions 32 and 33 is provided with a lifting area according to the present invention generally defined by the outer surface 34 of a non-pressure supporting boundary member indicated generally as 35. The area defined by the surface 34 comprises substantially the entire upper surface of the assemblies 30. To assist in lateral control when the aircraft 10 is travelling in a forward direction, the assemblies 30 may each also be provided with a vertical stabilizer 36 fitted with an appropriate rudder 37. These latter elements, however, are for minor control purposes only and form no particular part of the present invention.

Referring now to FIG. 3, the principle of operation of the present invention (i.e., the "Willis effect") may be more fully understood. In FIG. 3, one of the lift and control assemblies 30 is illustrated and diagrammatically includes a duct 40 for delivering air under pressure from a source (to be described in detail hereinafter) to a manifold 41 having an outlet nozzle 42 longitudinally disposed therein. The nozzle 42 is an elongated slit opening of 0.050 inches maximum height. An aerodynamically configured lifting element 43 is provided which has an upper surface 44 that is contiguous with the lower portion of the nozzle 42. The lifting element 43, which may be in the form of a sheet metal plate or member, extends outwardly from the manifold 41 and is curved downwardly terminating in a nozzle portion as at 45. It is preferred that the lifting element 43 be parabolic or eliptical in cross-section as will be discussed in greater detail hereinafter. It is to be noted that the nozzle 42 can take the form of a plurality of close adjacent nozzle openings of similar dimensions. What is desired is a source of a thin sheet of uniformly pressurized air flowing outwardly from adjacent the fuselage 20 over the upper surface 44 of the lifting element 43.

The non-pressure supporting boundary member 35 is illustrated as comprising a plurality of spaced rods, bars, webs, or screen elements 46, thus to porously define the outer boundary of a generally divergent passageway 47 intermediate the inner surface of the elements 46 and the upper surface 44 of the lifting element 43. It is preferred that the porosity of surface 35 be at least 40%. It is also preferred that the boundary member 35 be parabolic or eliptical in cross-section. An enlarged view of the structure of a portion of FIG. 3 is shown in FIG. 6. As indicated with reference to FIGS. 3 and 6, it is desired that the sheet of compressed air from the manifold 41 flow over the upper surface 44 of each lifting element 43 in uniform laminar flow throughout the longitudinal extend thereof as indicated by the arrows 50 within the passageway 47. To prevent the aforementioned disruptive turbulence within the passageways 47, the passageway 47 should be slightly divergent and the spacing between the elements 46 (i.e., the porosity of the nonpressure supporting member 35) such that sufficient augmenting air, as indicated by the arrows 51, is induced to be aspirated along the confined passage-way 47, as necessary, to maintain the laminar flow symbolized by the arrows 50. The divergence and porosity will, of course, be a function of both the fluid dynamics and the curve of the lifting element 43. These relationships can be easily determined employing apparatus and techniques well known to those in the aerodynamic art which apparatus and techniques per se form no part of the present invention. It has been found that the preferred parabolic shape results in an aspirated to primary air ratio of as much as 6:1, with attendant high lifting forces produced.

It has been found that superior results are obtained (and such construction is therefore preferred) if sidewalls 264 as shown dotted in FIGS. 1 and 2 are positioned on the ends and intermediate of the upper surface 44 and the boundary member 35 to contain and seal the air flow in channels.

Figure 7:
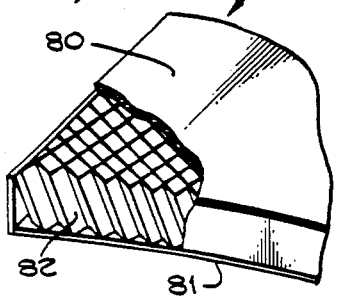
FIG. 7 is a partially cutaway segment of one embodiment of the porous member employed in the lifting element of the present invention.
Figure 9:
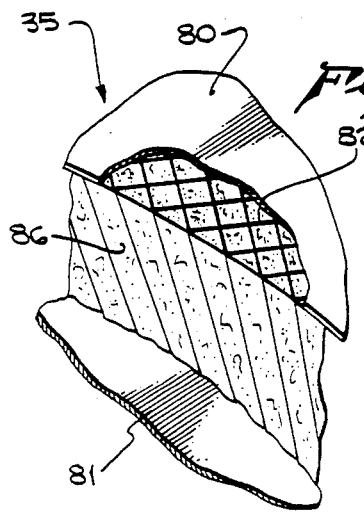
FIG. 9 is a partially cutaway segment through the porous member employed in the present invention according to an alternate embodiment thereof.

The primary lifting force is, thus, derived by flowing a high velocity thin sheet stream of air over the upper surface 44 whereby a negative pressure below that of atmosphere is created according to Bernoulli's principle, as indicated by the arrows 52 in FIG. 3. The resultant upward force from the lower solid surface of the lifting element 43 is the primary lifting force for vehicle take-off, landing, and hovering modes. The flow augmentation provided by the induced aspiration through the non-pressure supporting boundary member 35 serves to insure maintenance of the laminar flow indicated by the arrows 50, thereby maximizing the resultant lifting force. The required flow of air through the porous member 35 can be induced by its being constructed in the manner of FIG. 9 wherein the metallic honeycomb 82 has a sound-abating/air passing material such as fiberglass, steel wool, or a sintered material disposed therein to assist in noise abatement. As indicated by laboratory tests to date, the metallic mesh material 80, 81 is preferably of a stainless steel screen or mesh with approximately 50% open areas. The material may also be a perforated sheet of metallic material having a plurality of openings therein for approximately the same percentage. As thus constructed with the honeycomb material 82 therebetween, the boundary member 35 is provided with a combination of structural rigidity and high porosity. To assure aspiration through the honeycomb material 82 and aid in sound abatement, the sidewalls forming the honeycomb material 82 should be angled between 15° and 45° from normal in the direction of fluid flow as shown in FIGS. 4 and 7. If the top of one honeycomb sidewall overlaps the bottom of the next adjacent sidewall, the sound abatement will be maximized.

As shown in FIG. 4, air is delivered, in the manner described hereinbefore, through the manifold 41 and through the slit nozzle 42 to the passageway 47 in the direction of arrows 50. This air is induced to follow the surface 44 by the existence of the boundary member 35. Air is aspirated, as indicated by the arrows 51, through the openings provided in the angled honeycomb 82 of the member 35. The divergent passageway 47 can be terminated in an outwardly expanding longitudinal nozzle generally indicated as 83 existing between nozzle portion 45 of lifting element 43 and outer nozzle portion 88 disposed longitudinally on the opposite side of passageway 47 from nozzle portion 45.

Flow through the passageway 47 can be increased by airflow from a lower manifold 84 having a tangential outlet 85 that communicates with the throat 86 (i.e. venturi) of the nozzle 83 at the end of the sheet 43. The lower manifold 84 is provided with air under pressure from the same source as the manifold 41 and serves to aid in inducing air aspiration into the passageway 47 and to thus maintain the desired laminar flow over all areas of the surface 44 of the lifting element 43. Consequently, the desired maximized lifting force is created on the lifting elements 43 as indicated by the arrows 52.

Figure 11:
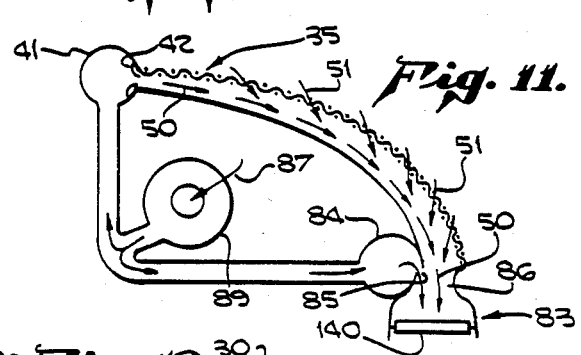
FIG. 11 is a simplified drawing of the airflow employed in the preferred embodiment of the present invention.

This mode of operation is shown in simplified form in FIG. 11. As can be seen, outside air 87 is drawn into the pressurized air supply means 89 from whence it is forced under pressure into manifold 41 and lower manifold 84. The air within manifold 41 passes therefrom through slit nozzle 42 to form the laminar sheet airflow symbolized by the arrows 50 through the addition of the induced aspirated air indicated by the arrows 51. That air entering lower manifold 84 is directed through the tangential outlet 85 into the throat 86 of nozzle 83 to increase the airflow through the venturi created by throat 86 of nozzle 83 to, thereby, create a low pressure area tending to draw the laminar flow air 50 into the nozzle 83 and out thereof to be utilized in a manner to be more fully described hereinafter.

Figure 10:
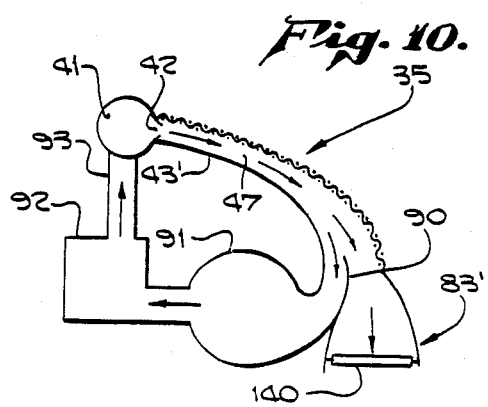
FIG. 10 is a simplified drawing of the airflow in an alternate embodiment of the present invention.

With brief reference to FIG. 10, an alternate nozzle arrangement is shown. In this instance, manifold 41 delivers air through nozzle 42 to the passageway 47 in the same manner as previously described with reference to the embodiment of FIG. 11. A nozzle 83' is provided at the end of the passageway 47 for the purpose of providing a reactive lift force and controls in the manner to be hereinafter described with reference to the preferred embodiment for passenger carrying. A portion of the air emerging from the passageway 47, however, is reintroduced to the system and recirculated by means of an inlet member 90 to a return manifold 91 which permits recirculation to the fan or compressor 92 which provides air to manifold 41 through the conduit 93. This partial recirculating arrangement provides ram pressure to the compressor inlet to reduce power requirements.

The engine or power supply and associated air compression and delivery system of the embodiment described above are shown in FIGS. 5 and 8. With reference first to the power supply and thrust arrangement of FIG. 5, a gas turbine engine is shown generally at 23 and consists of a compressor, combustion system, turbine, and required accessories. Hot gas from the engine is exhausted through the jet nozzle 24 which is fitted with a relatively conventional thrust deflector and spoiler 100. The central core machinery of the engine 23 is enclosed by an outer cool-gas plenum 101 which receives air which may be heated by passage through a suitable heat exchanger to be described hereinafter and wherein energy is added to the ambient incoming air. The air entering plenum 101 is accelerated through the plenum by primary jet pumps 102 and secondary jet pumps 103. Valves 104 are provided in conduits 105 from which the jet pumps 102 depend, the valves having a suitable operating mechanism 106. The valves permit bleed air from the compressor of the engine 23 to flow through the conduits 105 to air turbine motors 107 which drive compressor elements 108. The exhaust from the air turbine motors 107 is coupled through conduits 109 to the secondary jet pumps 103. Air to the compressor 108 is introduced at inlet 110 and exhausted through the conduit 111 past check valves 112 to a supply conduit 40. As previously illustrated in FIG. 3, the supply conduit 40 is connected to the manifold 41.

It should be noted that the exhausted air from the plenum 101, with heat energy added, forms an outer thrust annulus effectively utilizing energy available and acting as an efficient sound abatement mechanism for the hot gas shearing at the nozzle 24. The clam shell spoilers 100 may be suitably deployed as thrust reversers as used with many conventional jet reaction engines on normal aircraft. These serve to back-pressure the compressor of the engine 23, delivering hot bleed gases to the air turbine motors 107 and to the primary jet pump 102. Such action of the spoilers or clam shells 100 also serves to aspirate and retain the outer annulus airflow for added pumping thrust spoiling. The valves 104 serve to conserve bleed air and the control 106 therefore, may be modulated from a suitable pressure transducer which may be located upstream of the primary valve 104. This arrangement allows total energy recovery and energy conservation as it is a demand system regulated by requirements of the compressors 108 that are also compatible with all flight modes. The scoop inlets 110 for the compressors 108 receive the ambient air to create a compression ratio in the order of 2.2:1 and the check valves 112 prevent loss of pressure in the event one compressor becomes inoperative.

Figure 8:
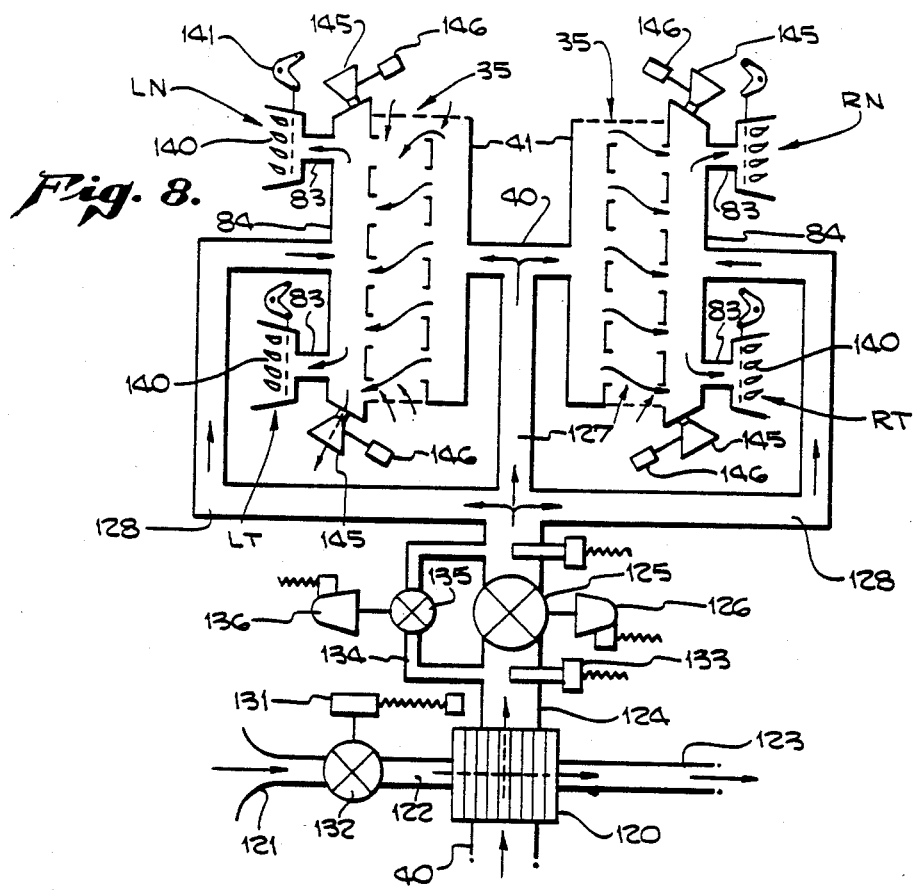
FIG. 8 is a simplified drawing of the pressurized air control and manifolding system employed in the lift and control assemblies of the present invention in one embodiment.

Turning now with reference primarily to FIG. 8 taken in conjunction with FIG. 5, one manner of delivery, use, and control of the air flowing through the system is shown. Air under high pressure from the compressors 108, as previously described, is delivered through the conduits 111 and join in an outlet conduit 40. As shown in FIG. 8, the air in conduit 40 passes in heat exchange relationship to ambient air by use of heat exchanger 120. Ambient air is delivered through a scoop 121 to a conduit 122 through the heat exchanger 120 and thereafter through a conduit 123 that may be connected to the annulus 101 surrounding the propulsion tubine 23. This connection is shown in FIG. 5. From the heat exchanger 120 the air is conducted through a conduit 124 under control of a primary valve 125 positioned in the conduit 124. The valve 125 is operated by a suitable controller 126 that is coupled to a pilot control system for presetting to enable the pilot to preselect his altitude flight corridor by mechanically setting the valve 125 to deliver a predetermined flow of air at a particular terminal pressure to the manifolds 41 and the plenums 84. The connection in the manifolds 41 is made by way of a conduit 127 and to the plenums 84 by way of conduits 128. The air in the conduit 124 downstream from the heat exchanger 120 has its temperature in the order of 300° F. by means of a temperature transducer 130 that is operatively connected to an operating mechanism 131 of a flow control valve 132 positioned in the conduit 122 which conducts ambient air through the heat exchanger 120. In order that the efficient use of the bleed air from the compressor of the engine 23 may be accomplished, a pressure transducer 133 is positioned in the conduit 124 upstream from the valve 125. The transducer 123 is operatively connected to the controllers 106 of the valves 104, thus to regulate bleed air from the engine compressor in the manner described in connection with FIG. 5. A bypass conduit 134 is also provided about the primary valve 125. An altitude compensating vernier valve 135 operable by a controller 136 is positioned in the bypass conduit 134. The controller 136 is coupled to the pilot's control and may also be mercury vapor contolled whereby to maintain desired altitude of the aircraft.

Figure 12:
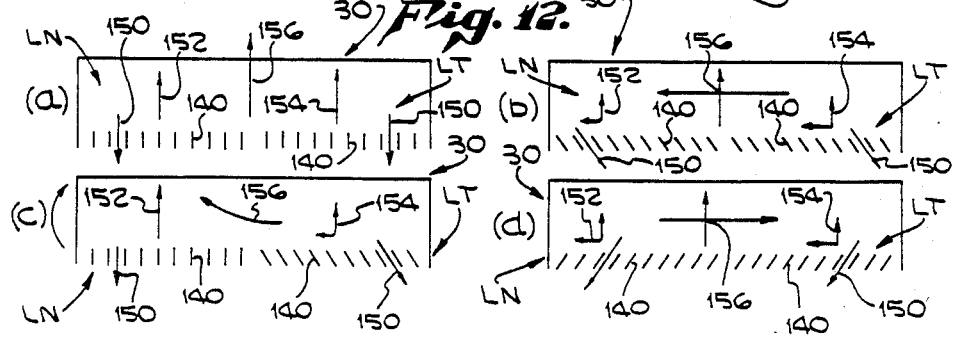
FIGS. 12(a)-12(d) is a simplified drawing of one manner of attitude control for pitch, roll, and altitude employed in the present invention.

As previously described, the air delivered to the manifold 41 flows through the passageway 47 of the lift and control assemblies 30. The air is also delivered to the lower manifold 84 and from the lower manifold 84 through the nozzle 83. As shown diagrammatically in FIG. 8 and in cross-section in FIG. 11, a plurality of vanes 140 are disposed longitudinally traverse nozzle 83. The vanes 140 are controlled through an appropriate linkage 141 connected in the usual manner to the pilot's control and are able to control the pitch and roll of the aircraft by selectively deflecting the air emerging from the nozzles 83 away from the vertical direction. This action can best be understood with simultaneous reference to FIGS. 8 and 12. FIG. 12 diagrammatically shows the effect of the movable vanes 140 in different attitudes. FIG. 12 symbolically shows the lift and control assemblies 30 in the same position as the aircraft 10 of FIG. 2. That is, it can be visualized in viewing FIG. 12 that the front or nose of the aircraft 10 is to the viewers left and that the tail or aft end is to the viewer's right. As will be noted, the movable vanes 140 are grouped into a left-hand (or nose) portion and a right-hand (or tail) portion. These correspond to the groups labeled LN and LT (standing for "left nose" and "left tail") respectively. The right-hand side of the aircraft has a corresponding pair of controlled nozzle openings for the right nose and right tail labeled, appropriately, RN and RT, respectively. Referring first specifically to the (a) portion of FIG. 12, the vanes 140 of both the LN and LT portions are in a neutral or non-deflecting position allowing the merging air symbolized by the arrows 150 to pass vertically downward so that the reactant force vector at the left nose indicated by the arrow 150 is only upward and the reactant force vector at the left tail symbolized by the arrow 100 and 154 is also totally upward such that the resultant lift force on the left lift and control assembly 30 is vertical as symbolized by the arrow 156.

Referring now to the (b) portion of FIG. 12, both the LN and LT vanes 140 have been moved to deflect the merging air 150 in a slightly rearward direction. Both the resulting force vectors 152 and 154 are a combination of lifting and forward directing forces. Correspondingly, the resultant effect on the left lift and control assembly 30 is symbolized by the crossed arrows 156 as being a horizontally disposed vertical and forward movement. As can be seen by reference to the (d) portion of FIG. 12, a correspondingly horizontal, vertical and rearward motion can be effected by moving the LN and LT vanes 140 to effect equal deflection of the air 150 in a forward direction.

Referring now the the (c) portion of FIG. 12, it can be seen how combined movement of the LN and LT vanes 140 to different attitudes can effect an attitude change in the aircraft. In this example, the LN vanes 140 are disposed vertically to allow the air 150 to produce a reactant force 152 in only the vertical direction. At the same time, however, the LT vanes 140 are disposed to deflect the air 150 rearward, thus imparting combined vectors 154 in both the vertical and forward direction. The resultant effect as symbolized by the curved arrow 156 is a combined forward and nose-up reaction on the left lift and control assembly 30.

With reference to the various deflection possibilities shown in the views of FIG. 12 and those that can be envisioned following inspection of FIG. 12, it can be easily envisioned how the positioning of the vanes 140 of both the left and right lift control assemblies 30 in the manner of the (c) portion of FIG. 12, would cause the aircraft 10 to remain in a stable horizontal roll position while pitching vertically upward.

If the LN vanes 140 are moved to deflect the air 150 in one direction and the LT vanes 140 are moved to deflect the air 150 in the opposite direction, it should be apparent that a reduction in reactive lift force will be effected without any resultant forward or rearward reactive force (i.e., they are self-cancelling). If, therefore, the vanes 140 on the left lift and control assembly 30 are placed in such configuration and, simultaneously, the vanes 140 comprising the RN and RT groupings of the right lift and control assembly 30 are placed in the configuration of the (a) portion of FIG. 12, the aircraft will be placed in a left roll condition.

Thus, it can be seen that by selectively deflecting the emerging air from the passageways 47 flowing through the nozzles 83, control of the aircraft can be effected. It should also be appreciated at this point, that the additional air forced through the nozzle 83 by the embodiment of FIG. 11 provides for an increased reactive airflow whereby control of the aircraft by the foregoing manner is enhanced. It should also be appreciated that a total lift on the aircraft can be effected by simultaneously moving all the deflecting vanes 140 in the same amount. Thus, by controlling the movement of the vanes in such a manner simultaneously as a function of the altitude sensing apparatus previously discussed, the aircraft can be made to maintain a given preselected altitude as a function of both the controlled airflow through the passageways 47 and the deflection of the airflow (and resultant reactive force) emerging from the nozzles 83.

Referring now once again primarily to FIG. 8, it will be seen that the lower manifolds 84 are also provided with four opposing vectoring crossed nozzles 145 that are used primarily only when the aircraft is in a hovering, vertical take-off, or landing mode for steering and maneuvering control; i.e., rotational and yaw control. The nozzles 145 are each provided with actuators 146 that are suitably connected to the pilot's control station. These controllers may be operated by a normal thumb-control arrangement on the control wheel to permit desired maneuvering of the aircraft by the application of horizontal directed rotational forces on the aircraft.

Turning now to FIGS. 13 and 14, the present invention in a second embodiment as incorporated into a pilotless, radio-controlled, lifting platform is shown, generally indicated as 200. The lifting platform 200 comprises a frame 202 mounted on a landing skid 204. A power plant 206 is mounted to the frame 202. A parabolic disc lifting element 208 is mounted to the frame 202 and the power plant 206. The output shaft 210 of the power plant 206 is disposed along the centerline 212 of the lifting element 208. Above the center of the parabolic disc lifting element 208 is disposed an inlet nozzle 214 and an annular manifold 260 disposed to be concentric with the centerline 212. A centrifugal compressor impeller 216 is disposed within inlet nozzle 214 on the output shaft 210. A parabolic disc porous boundary element 218 is connected concentrically about the inlet nozzle 214 and manifold 260 at the upper end and to the frame 202 and lifting element 208 by means of radially spaced sidewalls 220 so as to create a plurality of divergent wedge-shaped passageways 222 between the lifting element 208 and the boundary element 218. The spacing of the sidewalls 220 is shown in FIG. 14. Equal spacing of 45° to 60° is preferred.

Air is drawn into the inlet nozzle 214 by the centrifugal compressor impeller 216 and expelled radially outward equally about the circumference thereof across the lifting element 208 through the manifold 260 and the slit nozzle opening 262 which is also 0.050 inches in height or less. Thereafter, the operation of the lifting element 208 in combination with the boundary element 218 in inducing the aspiration of augmenting air through the porous boundary of element 218 into the divergent passageway 222 is substantially identical to the embodiment for passenger carrying as described in detail above.

The principle difference between the lifting platform 200 and the pilot driven aircraft of the previously described embodiment is in more simplified controls and the radio-controlled operation thereof. The space 224 between the inside of the lifting element 208 and the frame 202 can be used for a payload to be lifted by the platform 200. For example, a tank 226 can be placed therein for the containing of chemical spray for cropdusting. Whereas the conventional bi-plane as presently used for cropsdusting may have a useful payload of 100 pounds or less, it is calculated that the platform 200 of the present invention can be made with a diameter of 10 feet so as to be able to be moved to a field to be or a conventional flatbed truck dusted and yet have a payload of 500 pounds or more.

As can be seen in FIG. 13, space 224 also provides a convenient place to hide the radio receiver 228 to which the actuating controller 230 for the control surfaces is operably connected.

Several possible methods for effecting control of the lifting platform 200 are possible. Forward propulsion can be accomplished by positioning the engine exhaust pipe 232 from the power plant 206 to face horizontally and radially outward. The exhaust from the exhaust pipe 232 would, therefore, provide a reactive force in one direction which could be controlled by a gimbled nozzle 234 placed over the outlet of the exhaust pipe 232 and controlled by one or more actuators 236. That would, of course, make one point on the disc-shaped lifting platform 200 be the "front" and the point of the gimbled nozzle 234 be the "rear".

In the particular applications for which the lifting platform 200 is particularly adapted (i.e., cropdusting), high-speed forward mobility is not particularly necessary of even desirable. Rather, it is more desirable to be able to take off and land vertically and to move forward, backward, and sideward at a low speed rate with little or no downwash. For example, in cropdusting, the ideal situation would be to run a "pattern" wherein the lifting platform 200 started at one corner of the field, moved along one edge, stopped at the far end, shifted sideways one spray width, and went back down the field in the opposite direction to the far end, moved sideward one spray width again, and repeated the same procedure over and over until the field was sprayed completely. As can be seen, this type of manuever does not require a "front" or "back". Accordingly, a control system which is easily operable by radio control and which is simple to construct and maintain is the most highly desirable.

Referring briefly to FIG. 14, assume that the top view of the lifting platform 200 is designated at four points as north ("N"), east ("E"), south ("S"), and west ("W") being the top, right, bottom, and left sides as the figure is viewed, respectively. For simplified control particularly adaptable for radio control operation, the lifting platform 200 can be simply and conveniently controlled with some means for attitude control located at the four 90° separated locations (i.e., N, E, S, and W). If the vertical lift can be tilted from the vertical an angle θ, a vertical component in combination with a horizontal component will be produced. Thus, if either additional lift can be created at the "south" point and/or reduced lift produced at the "north" point, a horizontal force vector will be produced in the northerly direction and the lifting platform 200 will move in the northerly direction. Likewise, if the "west" edge of lifting platform 200 is raised and/or the "east" edge is lowered, the lifting platform will move in an easterly direction.

Increasing the lift over a radial portion of the lifting element 208 is difficult. By contrast, reducing the lift over a radial portion of the lifting element 208 is easily accomplished and, therefore, provides a unique and simple form of attitude control for the lifting platform 200.

Turning now to FIGS. 15 and 16, the preferred method of control for the lifting platform 200 is shown. A tapered vane 266 is placed at each desired control point about the periphery. The vane 266 is adapted to be moved into the air stream as a "spoiler" by the solenoid 268, thus reducing the lift at that point as a function of the amount disposed in the air stream.

While not preferred, an alternate control method of fairly simplified form is shown on the left side of FIG. 13 as the Figure is viewed. Therein, a plurality of control flaps 254 are positioned about the periphery of the bottom of the lifting element 208 and higned thereto. Each control flap 254 is operably connected to the frame 202 by an actuator 252. With the control flaps 254 all withdrawn from contact with the emerging airstream about the periphery of the lifting platform 200, only equalized lift is produced and no horizontal force vector is present. By causing the actuator 252 to push a control flap 254 into the emerging airstream, the emerging airstream will impinge aganst the control flap producing a horizntal force vector component.

It should also be noted that any of the techniques for airflow augmentation and control described in detail with respect to the first embodiment could be employed with this latter embodiment but are not repeated once again. They are to be considered within the scope of either embodiment. This will be particularly realized when it is recognized that while the first embodiment described two opposed lifting elements, this latter, circular embodiment can be considered as having two opposed semi-circular lifting elements.

While the example shown and described above employs control elements at four 90° spaced points about the periphery of the lifting platform, it should be understood that such placement affords one of the simplest methods of control, but that either type of control element as hereinbefore described could be placed at three 120° spaced locations or six 60° spaced points about the periphery of lifting platform 200 with success.

Thus it can be seen that the aircraft hereinbefore described has met its stated objective by increasing lift through employment of the "Willis effect" and by the novel control method employed therein.

Having thus described my invention, I claim:

1. The method of creating a vertical lifting force on a lifting element which smoothly curves outwardly from horizontal to vertical comprising the steps of:
   (a) flowing primary fluid in a thin sheet from a pneumatic plenum via a rectangular nozzle extending substantially the full length of the lifting element to cause said sheet to flow across the upper surface of the element from the horizontal side to the vertical side opposite thereof;
   (b) divergently bounding said flowing primary fluid adjacent the entire length of the upper surface of the element from the horizontal to vertical by a porous surface which smoothly curves in generally like manner but slightly divergently; and
   (c) continuously adding sufficient augmenting fluid to said flowing primary fluid through the porous surface to maintain the combined flowing fluid stream in laminar flow adjacent the upper surface of the element whereby a differential pressure is created across the element tending to lift it vertically.

2. The method of claim 1 and additionally comprising the step of:
   creating a low pressure area adjacent said vertical opposite side of the element to increase the speed of the flowing fluid.

3. The method of claim 1 wherein said step of divergently bounding said flowing primary fluid additionally includes the step of:
   segmenting and confining said flowing primary fluid in channels.

4. In an aircraft having an aerodynamically shaped body for housing one or more passengers, a pair of lifting elements which curve outward from the body smoothly from horizontal to vertical disposed longitudinally along the body on opposite sides thereof, and power means for supplying a source of air under pressure, the method of providing lift and control for the aircraft comprising the steps of:
   (a) simultaneously directing primary air from the power means horizontally outward across the upper surfaces of the pair of lifting elements in a thin sheet from pneumatic plenums via rectangular nozzles extending substantially the full length of the lifting elements;
   (b) divergently bounding the airflow adjacent the entire length of the upper surfaces of the lifting elements from horizontal to vertical by porous surfaces which smoothly curve in generally like manner but slightly divergently relative said upper surfaces of the lifting elements;
   (c) continuously including the aspiration of sufficient augmenting air through said porous surface into said divergently bounded airflow to maintain the combined airflow in laminar flow adjacent the upper surfaces of the lifting elements; and,
   (d) creating an imbalance in the overall lift on the aircraft which produces a resultant force vector on the aircraft having both a lift component and a horizontal force component in the desired direction of horizontal travel.

5. The method of claim 4 wherein said step of creating an imbalance comprises:
   reducing the flow of primary air from the power means adjacent the peripheral portion of the lifting elements in the direction of desired travel with a spoiler whereby the lift is reduced and the aircraft is tipped downward in that direction.

6. The method of of claim 4 wherein said step of creating an imbalance comprises:

selectively deflecting portions of the vertical combined airflow away from the vertical direction to create imbalances in the vertical lift created on the aircraft whereby control is effected by deflecting on one lifting surface more than the other to create a roll force on the aircraft and by simultaneously deflecting on both lifting surfaces adjacent one end of the aircraft more than on the opposite end to create a pitch force on the aircraft.

7. An aircraft comprising:

(a) an aerodynamically shaped body for housing one or more passengers;

(b) a pair of lifting elements carried by said body disposed longitudinally along said body on opposite sides thereof and extending outwardly from said body, said lifting elements curving smoothly downward from being substantially horizontal adjacent said body to substantially vertical at the outboard edge thereof;

(c) power means carried by said body for producing a supply of pressurized air at an output thereof;

(d) means connected to said output of said power means for directing a flow of air in a thin sheet from a pneumatic plenum via a rectangular nozzle extending substantially the full length of the lifting elements to cause said sheet to flow across the upper surfaces of said pair of lifting elements; and, (e) means carried by said lifting element for divergently bounding said airflow by a porous surface which smoothly curves in generally like manner but slightly divergently adjacent the entire length of said upper surfaces of said lifting elements, said bounding means being of sufficient porosity in relation to said airflow that sufficient augmenting air is induced to be aspirated through said porous bounding means and added to said airflow to maintain the resultant combined airflow in laminar flow adjacent said upper surfaces of said lifting elements.

8. The aircraft of claim 7 and additionally:

means for segmenting and confining the flow of air in channels.

9. The aircraft of claim 7 and additionally comprising:

means disposed between said upper surfaces of said lifting elements and said porous bounding means adjacent the outboard ends thereof for selectively deflecting portions of the vertical combined airflow emerging therefrom away from the vertical direction to create imbalances in the vertical lift created on the aircraft whereby control is effected by deflecting on one of said lifting elements more than on the other to create a roll force on the aircraft and by simultaneously deflecting on both said lifting elements adjacent one end of the aircraft more than on the opposite end thereof to create a pitch force on the aircraft.

10. The aircraft of claim 9 wherein:

said deflecting means comprises a plurality of controlled movable spoilers adapted to be adjustably disposed transverse the space between said upper surfaces of said lifting elements and said bounding means.

11. The aircraft of claim 9 wherein said deflecting means comprises:

(a) a pair of longitudinal nozzle assemblies connected to receive said airflow as it emerges from between respective ones of said lifting elements and said bounding means, each of said assemblies having a longitudinal nozzle opening facing in a substantially vertically downward direction; and, (b) a plurality of controlled movable vanes disposed transverse each of said nozzle openings.

12. The aircraft of claim 11 wherein:

(a) each of said nozzle assemblies includes a venturi constriction disposed longitudinally therein between the point of receiving said emerging airflow and said movable vanes; and additionally including, (b) means connected to said output of said power means for directing an additional airflow through said venturi constrictions in combination with said emerging airflow whereby an increased volume of air is available passing through said vanes for effecting control of the aircraft and a low pressure area is created outboard of said lifting elements to induce increased airflow over said lifting elements to thereby increase the lifting forces on said lifting elements.

13. The aircraft of claim 9 wherein:

said bounding means comprises a porous material having a sound abating material disposed within the pores thereof.

14. The aircraft of claim 13 wherein:

the effective porosity of said material including said sound abating material is about 50%.

15. The aircraft of claim 9 wherein:

said bounding means comprises a pair of porous outer sheet members carried by a honeycomb material disposed therebetween.

16. The aircraft of claim 15 wherein:

said honeycomb material has an airflow passing sound abating material disposed in the voids thereof.

17. The aircraft of claim 15 wherein:

said honeycomb's core structure is angled away from normal in the direction of fluid flow from 15° to 45°.

18. The aircraft of claim 17 wherein:

said honeycomb's core structure is angled and sized such that the top of one honeycomb core sidewall overlaps the bottom of the next adjacent core sidewall whereby sound abatement is maximized.

19. An aircraft comprising:

(a) a frame having means for supporting said frame extending downward therefrom;

(b) circular lifting element carried by said frame and disposed above said frame to create a space between said lifting element and said frame, said lifting element curving smoothly downward from being substantially horizontal adjacent the center thereof to being substantially vertical at the outboard edge thereof;

(c) power means carried by said frame within said space for producing a supply of pressurized air at an output thereof;

(d) means connected to said output of said power means for directing a flow of air in a thin sheet from a pneumatic plenum via a rectangular nozzle extending substantially the full length of the lifting element to cause said sheet to flow outwardly across the upper surface of said lifting element; and, (e) means carried by said lifting element for divergently bounding said airflow by a porous surface which smoothly curves in generally like manner but slightly divergently adjacent the entire length of said upper surface of said lifting element, said bounding means being of sufficient porosity in relation to said airflow that sufficient augmenting air is induced to be aspirated through said porous bounding means and added to said airflow to maintain the resultant combined airflow in laminar flow adjacent said upper surface of said lifting elements.

20. The aircraft of claim 19 and additionally:
means for segmenting and confining the flow of air into wedge-shaped channels of between 45° and 60°.

21. The aircraft of claim 19 and additionally comprising:
a plurality of spoiler means adapted to be adjustably disposed between said upper surface of said lifting element and said porous bounding means adjacent the outboard ends about the periphery at spaced points thereof for selectively deflecting portions of the vertical combined airflow emerging therefrom away from the vertical direction to create imbalances in the vertical lift created on the aircraft whereby control is effected.

22. The aircraft of claim 19 wherein:
said bounding means comprises a porous material having a sound abating material disposed within the pores thereof.

23. The aircraft of claim 22 wherein:
the effective porosity of said material including said sound abating material is about 50%.

24. The aircraft of claim 19 wherein:
said bounding means comprises a pair of porous outer sheet members carried by a honeycomb material disposed therebetween.

25. The aircraft of claim 24 wherein:
said honeycomb material has an airflow passing sound abating material disposed in the voids thereof.

26. The aircraft of claim 24 wherein:
said honeycomb's core structure is angled away from normal in the direction of fluid flow from 15° to 45°.

27. The aircraft of claim 26 wherein:
said honeycomb is angled and sized such that the top of one honeycomb core sidewall overlaps the bottom of the next core adjacent sidewall whereby sound abatement is maximized.

28. The method of creating a vertical lifting force on a disc-shaped lifting element comprising the steps of:
(a) flowing primary fluid in a thin sheet from a pneumatic plenum via a rectangular nozzle extending substantially the full length of the lifting element to cause said sheet to flow across the upper surface of the element from the center to the outer periphery thereof;
(b) divergently bounding said flowing primary fluid by a porous surface which smoothly curves in generally like manner but slightly divergently adjacent the entire length from the center to the periphery of the upper surface of the element with a porous surface of at least 40% porosity; and,
(c) continuously adding sufficient augmenting fluid to said flowing primary fluid through the porous surface to maintain the combined flowing fluid stream in laminar flow adjacent the upper surface of the element whereby a differential pressure is created across the element tending to lift it vertically.

29. The method of claim 28 and additionally comprising the step of:
creating a low pressure area adjacent the outer periphery of the element to increase the speed of the flowing fluid.

30. The method of claim 28 wherein said step of divergently bounding said flowing primary fluid additionally includes the step of:
segmenting and confining said flowing primary fluid in wedge-shaped channels.

31. The method of claim 30 wherein:
said channels are between 45° and 60° each.

32. In an aircraft having an aerodynamically shaped circular lifting element and power means for supplying a source of air under pressure, the method of providing lift and control for the aircraft comprising the steps of:
(a) directing primary air from the power means from the center horizontally outward across the upper surfaces of the lifting element in a thin sheet from a pneumatic via a rectangular nozzle extending substantially the full length of the lifting element to cause said sheet to flow across the upper surface of said lifting element;
(b) divergently bounding the airflow by a porous surface which smoothly curves in generally like manner but slightly divergently adjacent the entire length from the center to the periphery of the upper surface of the lifting element;
(c) continuously inducing the aspiration of sufficient augmenting air through said porous surface into said divergently bounded airflow to maintain the combined airflow in laminar flow adjacent the upper surface of the lifting element; and,
(d) creating an imbalance in the overall lift on the aircraft which produces a resultant force vector on the aircraft having both a lift component and a horizontal force component in the desired direction of horizontal travel.

33. The method of claim 32 wherein said step of creating an imbalance comprises:
introducing a spoiler in the air flow at a point on the periphery opposite the direction of desired travel whereby the lift is reduced and the aircraft is tipped downward in said direction.

34. In an aircraft having an aerodynamically shaped body for housing one or more passengers, a pair of lifting elements which curve outward from the body smoothly from horizontal to vertical disposed longitudinally along the body on opposite sides thereof, and power means for supplying a source of air under pressure, the method of providing lift and control for the aircraft comprising the steps of:
(a) simultaneously directing primary air from the power means horizontally outward across the upper surfaces of the pair of lifting elements in a thin sheet starting at 0.050 inch thickness or less;
(b) divergently bounding the airflow adjacent the entire length of the upper surfaces of the lifting elements from horizontal to vertical with a porous surface of at least 40% porosity;
(c) continuously inducing the aspiration of sufficient augmenting air through said porous surface into said divergently bounded airflow to maintain the combined airflow in laminar flow adjacent the upper surfaces of the lifting elements; and, (d) creating an imbalance in the overall lift on the aircraft which produces a resultant force vector on the aircraft having both a lift component and a horizontal force component in the desired direction of horizontal travel by selectively deflecting portions of the vertical combined airflow away from the vertical direction to create imbalances in the vertical lift created on the aircraft whereby control is affected by deflecting on one lifting surface more than the other to create a roll force on the aircraft and by simultaneously deflecting on both lifting surfaces adjacent one end of the aircraft more than on the opposite end to create a pitch force on the aircraft, said selectively deflecting comprises the steps of:

(d1) passing the emerging airflow from the upper surfaces of the lifting elements through a pair of longitudinal venturis disposed outboard of the respective lifting elements into respective longitudinal vertically downward facing nozzles having controlled movable vanes transverse thereof at least adjacent a portion of the front and rear of each of said nozzles;

(d2) injecting an additional quantity of pressurized air from the power means through the venturis into the respective nozzles to create an additional volume of pressurized air emerging from said nozzles and create a low pressure area adjacent the outboard end of the confined airflow paths to stimulate increased airflow therethrough with attendant increase in lift on the lifting surfaces thereby; and, (d3) moving said transverse vanes selectively in groups between positions parallel to the flow of the emerging air from said nozzles and at least partially transverse said emerging air whereby said air is selectively deflected.

35. The method of claims 1, 4, 28 or 32 wherein said step of flowing primary fluid in a thin sheet includes the substep of starting said thin sheet at 0.050 inches thickness or less.

36. The method of claims 1, 4, 28 or 32 wherein said step of divergently bounding includes the substep of bounding said primary fluid with a porous surface of at least 40% porosity.

37. The aircraft of claim 7 or 19 wherein said thin sheet has a starting thickness of 0.050 inches or less.

38. The aircraft of claim 7 or 19 wherein the porosity of said bounding means is at least 40%.

* * * * *